(12) United States Patent
Fefilatyev et al.

(10) Patent No.: US 9,672,240 B2
(45) Date of Patent: Jun. 6, 2017

(54) APPARATUS AND METHOD TO UPDATE GEOGRAPHIC DATABASE

(71) Applicant: HERE Global B.V., Veldhoven (NL)

(72) Inventors: Sergiy Fefilatyev, Chicago, IL (US); MacGregor Felix, Romeoville, IL (US); Eric Linder, Downers Grove, IL (US); Gregory Titievsky, Chicago, IL (US); Maxim Khailo, St. Charles, IL (US); Elizabeth Alonzi, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 282 days.

(21) Appl. No.: 14/086,462

(22) Filed: Nov. 21, 2013

(65) Prior Publication Data

US 2015/0141056 A1 May 21, 2015

(51) Int. Cl.
*H04W 4/02* (2009.01)
*G06F 17/30* (2006.01)

(52) U.S. Cl.
CPC ...... *G06F 17/30371* (2013.01); *H04W 4/021* (2013.01)

(58) Field of Classification Search
CPC .......................... H04W 4/021; G06F 17/30371
USPC ............ 455/456.1–461.3, 456.5–456.6, 457, 455/404.2, 407, 408; 707/690, 724, 725
See application file for complete search history.

(56) References Cited

U.S. PATENT DOCUMENTS

| 8,467,810 | B2 | 6/2013 | Kaplan |  |
|---|---|---|---|---|
| 9,453,734 | B2 * | 9/2016 | Pylappan | G01C 21/26 |
| 2003/0139179 | A1 * | 7/2003 | Fuchs | G07C 5/008 455/426.1 |
| 2004/0204835 | A1 * | 10/2004 | Vance et al. | 701/208 |
| 2008/0033644 | A1 * | 2/2008 | Bannon | 701/210 |
| 2008/0100018 | A1 | 5/2008 | Dieziger |  |
| 2009/0319616 | A1 * | 12/2009 | Lewis, II | H04W 24/00 709/206 |
| 2010/0014712 | A1 | 1/2010 | Sampedro Diaz et al. |  |
| 2010/0240399 | A1 * | 9/2010 | Roumeliotis | G06Q 30/0261 455/456.3 |
| 2010/0306211 | A1 | 12/2010 | Chaudhuri et al. |  |
| 2011/0208424 | A1 * | 8/2011 | Hirsch et al. | 701/208 |
| 2011/0238466 | A1 | 9/2011 | Haumont et al. |  |
| 2012/0254707 | A1 * | 10/2012 | Cooke | 714/799 |
| 2012/0259951 | A1 * | 10/2012 | Schalk | G07C 5/008 709/217 |
| 2013/0226457 | A1 * | 8/2013 | Goel | G01C 21/3476 701/540 |
| 2014/0012577 | A1 * | 1/2014 | Freeman | G06Q 30/0241 704/249 |
| 2014/0236937 | A1 * | 8/2014 | Hohs | 707/724 |
| 2014/0244634 | A1 * | 8/2014 | Duleba | G06F 17/30867 707/724 |

(Continued)

*Primary Examiner* — Cong Tran

(74) *Attorney, Agent, or Firm* — Lempia Summerfield Katz LLC

(57) ABSTRACT

A mobile device initiates communication with a server through a location based service and sends a user generated submission and a geolocation to the server. The server identifies an incomplete entry in a geographic database based on the geolocation and generates a probe question for the incomplete entry. The probe question requests that a user visually inspect or photograph an object or area near the geolocation. The server analyzes the information provided by the user in order to update the geographic database.

19 Claims, 9 Drawing Sheets

(56) References Cited

U.S. PATENT DOCUMENTS

2014/0280076 A1* 9/2014 Sumizawa .................... 707/722
2015/0007043 A1* 1/2015 Steinmetz ............. G06F 3/0484
                                                        715/745

* cited by examiner

APPARATUS AND METHOD TO UPDATE GEOGRAPHIC DATABASE

FIELD

The following disclosure relates to a method or system for updating a geographic database, or more particularly, a geographic database update using location based user prompts.

BACKGROUND

Navigation systems or devices provide useful features, including the identification of routes to destinations or points of interests. The navigation system can determine the optimal route to be taken by the end user to travel from the origin to the destination location from geographic data. In addition, the geographic data may include information about the locations of destinations or points of interests.

The collection of geographic data for use in navigation systems may be a significant undertaking. For example, the initial collection of data about the roads, destinations, and points of interest in a geographic area may be time consuming and require expensive professional equipment. Also, geographic data used in navigation systems may become out-of-date. There also may be errors in collected geographic data.

Updating and checking the geographic data may involve significant efforts. Therefore, providing up-to-date and accurate geographic data, such as for use in navigation systems, is a continuing effort.

SUMMARY

A mobile device initiates communication with a server through a location based service and sends a user generated submission and a geolocation to the server. The server identifies an incomplete entry in a geographic database based on the geolocation and generates a probe question for the incomplete entry. The probe question requests that a user visually inspect or photograph an object or area near the geolocation. The server analyzes the information provided by the user in order to update the geographic database.

BRIEF DESCRIPTION OF THE DRAWINGS

Exemplary embodiments of the present invention are described herein with reference to the following drawings.

DETAILED DESCRIPTION

A mobile device may include a navigation application, which determines the optimal route to travel from an origin location to a destination location from geographic data, or a map application, which provides maps that may be manipulated to show various portions of the geographic data. The geographic data may be updated through user inputs at the mobile device in response to interactions between the user and the navigation application or the map application. For example, the user may enter a search query, a personalized locator beacon, or scheduled a geographic reminder. The navigation application or map application provides the service to the user blended with one or more questions designed to update or augment the geographic database.

Figure 1:
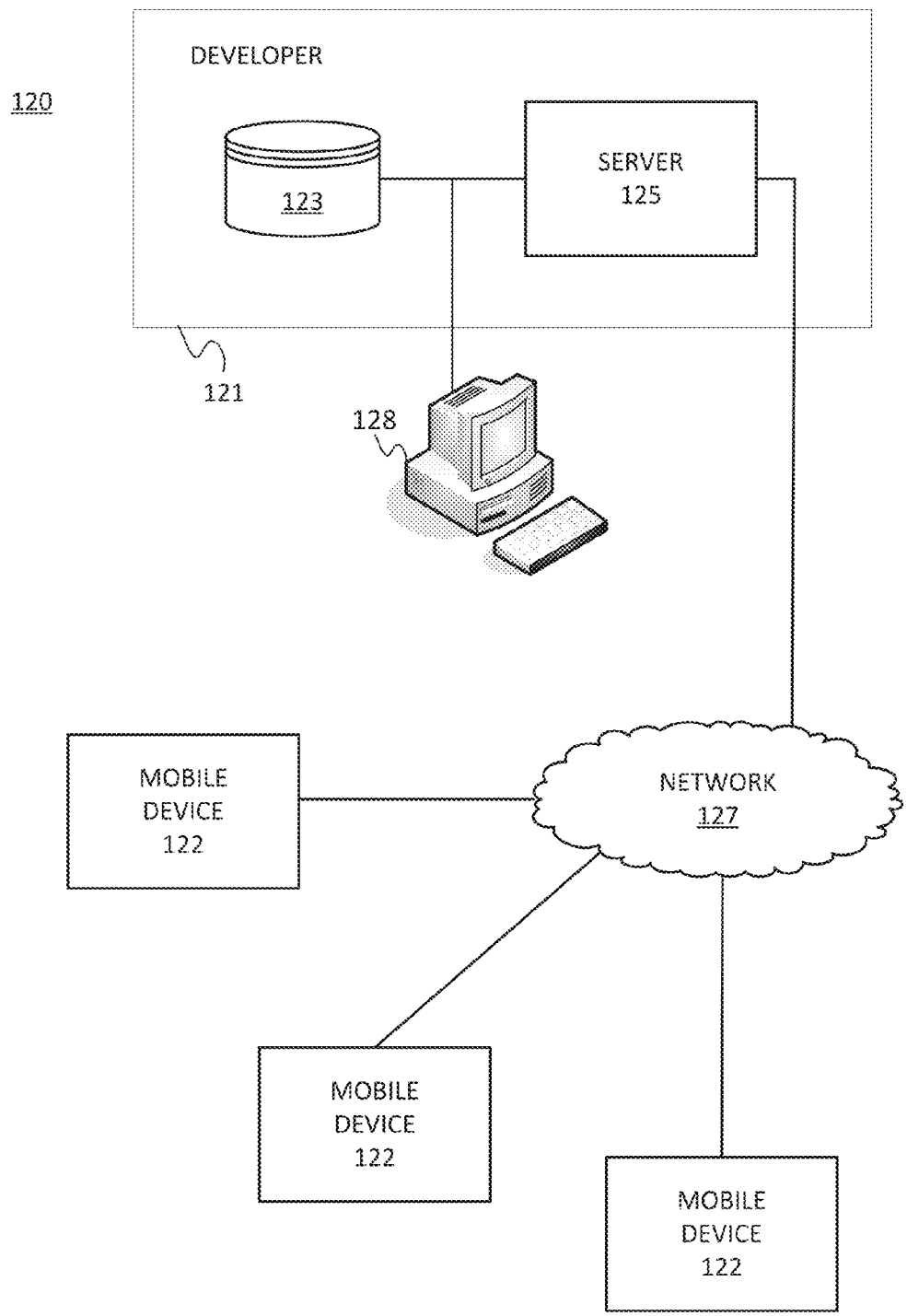
FIG. 1 illustrates an example system for updating a geographic database.

FIG. 1 illustrates an exemplary navigation system 120. The navigation system 120 includes a developer system 121, a mobile device 122 and a network 127. Additional, different, or fewer components may be provided. The developer system 121 includes a server 125 and a database 123. The developer system 121 may include computer systems and networks of a system operator (e.g., HERE Maps, NAVTEQ or Nokia Corp.).

Position circuitry (e.g., global positioning system) of the mobile device 122 may monitor the position or geolocation of the mobile device 122. A user of the mobile device 122 makes an entry in a navigation related application or a map related application ("application"). The user generated submission may request a location based service. Example location based services include geographic search, route generation, entry of a new location, entry of supplemental information, placement of a beacon, and entry of geo-temporal reminder.

In a geographic search the user generated submission may be the name of a location such as an address, a business name, or a point of interest. The location based service may represent the location on a map, which is displayed on the mobile device 122. In a route generation, the user generated submission may be the name of a location, or a request to receive directions to an already entered location. The location based service may generate turn-by-turn direction to the location, which are displayed on the mobile device 122.

For entry of a new location, the user generated submission is the name of a business or point of interest that the user would like to add to a map for other users to access. For example, the user may search for a location that cannot be accurately found by the application. When the user reaches the location, the user requests that the new location be added to the geographic database 123.

For entry of supplemental information, the user generated submission may be a photograph, a review, a social networking service tag, or another type of information tied to the location of the mobile device 122. For placement of a beacon, the user generated submission is the current location of the mobile device 122 that the user would like to return to in the future.

For entry of geo-temporal reminder, the user generated submission is a particular location that the user would like to be at a specific time. The location base service tracks the mobile device 122 and sends an alert if the mobile device 122 travels too far to reach the location by the specific time.

The mobile device 122 may associate the user generated submission and the geolocation data. In one example, a location code for the current position of the mobile device 122 is inserted in a data packet including the user generated submission. The location code may include latitude and longitude or another indication of location. The mobile device 122 sends the user generated submission and the geolocation data to the server 125 via the network 127.

The server 125 determines whether there are any incomplete entries in the geographic database 123 that are within a predetermined distance range to the location of the mobile device 122. The incomplete entry may be any type of information that is incomplete or unconfirmed in the geographic database 123. For example, the name of a geographic feature (e.g., building, parking zone, road, or point of interest) may be missing. In addition or in the alternative, the incomplete entry may be an attribute for a geographic feature. The attribute may be whether or not a road is a one way, a speed limit, hours for a parking zone, or hours of operation for the point of interest.

Unconfirmed information or an unconfirmed entry may be information that has been added to the geographic database 123 but not adequately tested or confirmed. For example, a user may have submitted the location of a new point of interest to the server 125. Before the new point of interest is permanently added to the geographic database 123, one or more other users may confirm the accuracy of the new point of interest.

The predetermined distance range may be a specific distance (e.g., 10 meters, 2 blocks, or 1 mile). The predetermined distance range may be a function of the mode of transportation or the current speed of the mobile device 122. A larger distance range may be used if the mobile device 122 is traveling in a motor vehicle than if the mobile device 122 is carried by a pedestrian. The predetermined distance range may depend on the type of incomplete or unconfirmed in the geographic database 123, for example the existence of a parking zone or a speed limit may be visible from a far distance but the hours of operation for a business may only be identifiable from a short distance.

The server 125 is configured to generate a probe question based on the incomplete or unconfirmed information in the geographic database 123. The probe question may describe an object for the user to visually inspect. The probe question may be a blended question that is combined or blended with the location based service. In other words, data from the location based service may be displayed at the same time or in collaboration with the probe question.

Various categories of probe questions are possible such as point of interest validation (e.g., Is there a coffee shop on your left?), point of interest ground truth collection (e.g., Confirm when located next to the coffee shop at 123 Main St.), point of interest discovery (e.g., What businesses are nearby?), map attribute validation (e.g., Is there two way traffic on Main St.?), map attribute discovery (e.g., Please list the road signs on Main St.), and map attribute ground truth collection (e.g., Please confirm the speed limit on Main St. is 30 miles per hour).

The user may provide an answer to the probe question via the mobile device 122. The mobile device 122 transmits the answer to the server 125. The server 125 is configured to modify the geographic database 123 based on the answer to the probe question from the mobile device 122. The server 125 may compare the answer to previously collected answers from other users. When a threshold number of users respond similarly for a specific probe question, the server 125 updates the geographic database 123 by modifying the corresponding incomplete or unconfirmed entry.

The server 125 may be configured to use the location based service as an incentive for the user to provide the answer for the probe question. For example, when the user of the mobile device 122 requests a geographic search or a route generation, the server 125 first provides a probe question related to the current position of the mobile device 122. After receiving a qualified answer, the server 125 provides the requested search results or route. In another example, when the mobile device 122 requests entry of a new location or entry of supplemental information, the server 125 may send a message that the entry will be added and available to other users upon receipt of an answer to the probe question. In another example, when the mobile device 122 sends a submission for placement of a beacon or entry of geo-temporal reminder, the server 125 may provide the location based service initially and then send the probe question in the future. The probe question may be sent before the geo-temporal reminder comes due or when the beacon is retrieved. The server 125 may inform the user that the location based service will be completed only if the probe question is answered.

As an incentive for user participation, the server 125 may maintain a point system for the probe questions. Users may be awarded points for submitting answers to the probe questions. The points may be spent on location based services. Alternatively, the points may be spent on ringtones, media, music downloads, merchandise stores or cash value.

Figure 2:
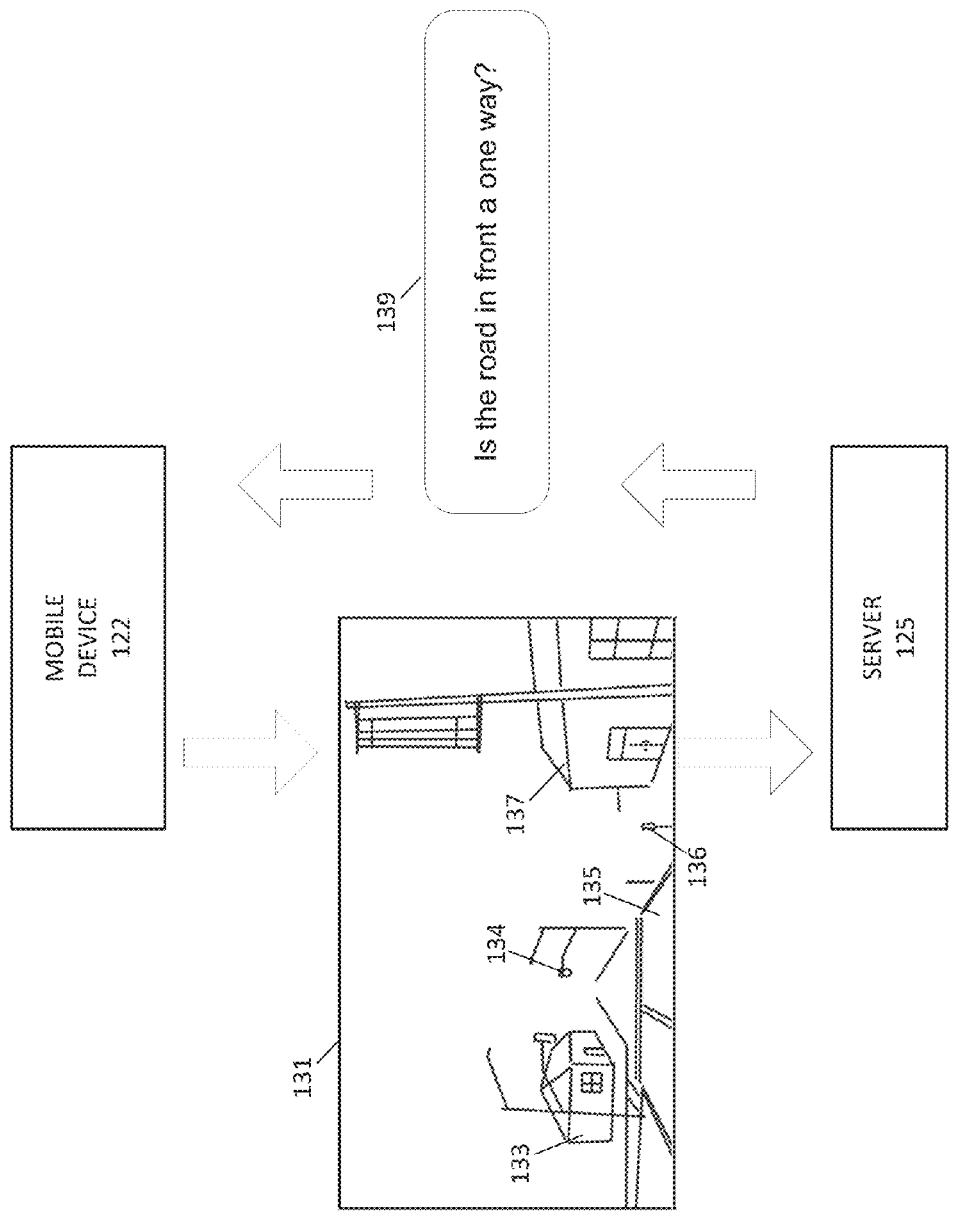
FIG. 2 illustrates an example probe question for updating a geographic database.

FIG. 2 illustrates an example blended question for updating the geographic database 123. The mobile device 122 captures an image 131. The image 131 may be collected to be added to a social networking service, added to a private collection, connected to a geo-temporal reminder, or for the purpose of adding a point of interest to the geographic database 123. Data indicative of the location of the mobile device 122 when the image 131 was collected may be combined with the image 131.

In one example, the server 125 compares the location of the mobile device 122 for areas of interest. The server 125 may analyze the objects in the image 131 to determine whether any objects are missing from the database 123. The server 125 may identify a store 133, a traffic light 134, a road 135, a parking sign 136, or a service station 137. The server 125 may return a probe message 139 to the mobile device 122. The probe message 139 may ask the user to collect information about objects nearby. The probe message 139 may ask the user to identify whether the road 135 in the image 131 is a one way.

In one example, feature recognition has been used to build the geographic database 123. For example, the image 131 may be a street side image collection by a collection vehicle outfitted with a camera. The server 125, or another device, may perform feature recognition on the image 131 in order to identify objects in the image indicative of geographic data. The feature recognition may include any combination of optical characteristic recognition (OCR), line detection, template matching, pattern matching, feature matching, or another technique.

For example, signs may be included in the image 131. The server 125 may be configured to perform template matching or OCR on the words in the signs. The words may be compared to a lookup table that includes common road attributes associate with sign information such as speed limits, curve warnings, parking zones, stop signs, crossings, or other examples. The server 125 queries the lookup table and modifies or adds road attributes in the geographic database 123 accordingly.

The mobile device 122 is a smart phone, a mobile phone, a personal digital assistant ("PDA"), a tablet computer, a notebook computer, wearable headwear, a personal navigation device ("PND"), a portable navigation device, and/or any other known or later developed portable or mobile computing device. The mobile device 122 includes one or more detectors or sensors as a positioning system built or embedded into or within the interior of the mobile device 122. The mobile device 122 receives location data from the positioning system.

The image 131 may be displayed as part of an augmented reality application. The image 131 may be a live image of the user's surrounding captured by a camera of the mobile device 122. Similarly, the mobile device 122 may be glasses or a headset that displays the image to the user in a heads up fashion. Alternatively, the image 131 may only include the overlay (e.g., probe message 139), which is displayed on the glass to overlay the actual view of the real world through the glasses.

The optional workstation 128 is a general purpose computer including programming specialized for the following embodiments. For example, the workstation 128 may receive user inputs for defining the probe questions or assigning probe questions to geographic attributes. The workstation 128 may receive user inputs for defining distance ranges for assigning probe questions to particular users. The workstation 128 includes at least a memory, a processor, and a communication interface.

The developer system 121, the workstation 128, and the mobile device 122 are coupled with the network 127. The phrase "coupled with" is defined to mean directly connected to or indirectly connected through one or more intermediate components. Such intermediate components may include hardware and/or software-based components.

The computing resources may be divided between the server 125 and the mobile device 122. In some embodiments, the server 125 performs a majority of the processing. In other embodiments, the mobile device 122 or the workstation 128 performs a majority of the processing. In addition, the processing is divided substantially evenly between the server 125 and the mobile device 122 or workstation 128.

Figure 3:
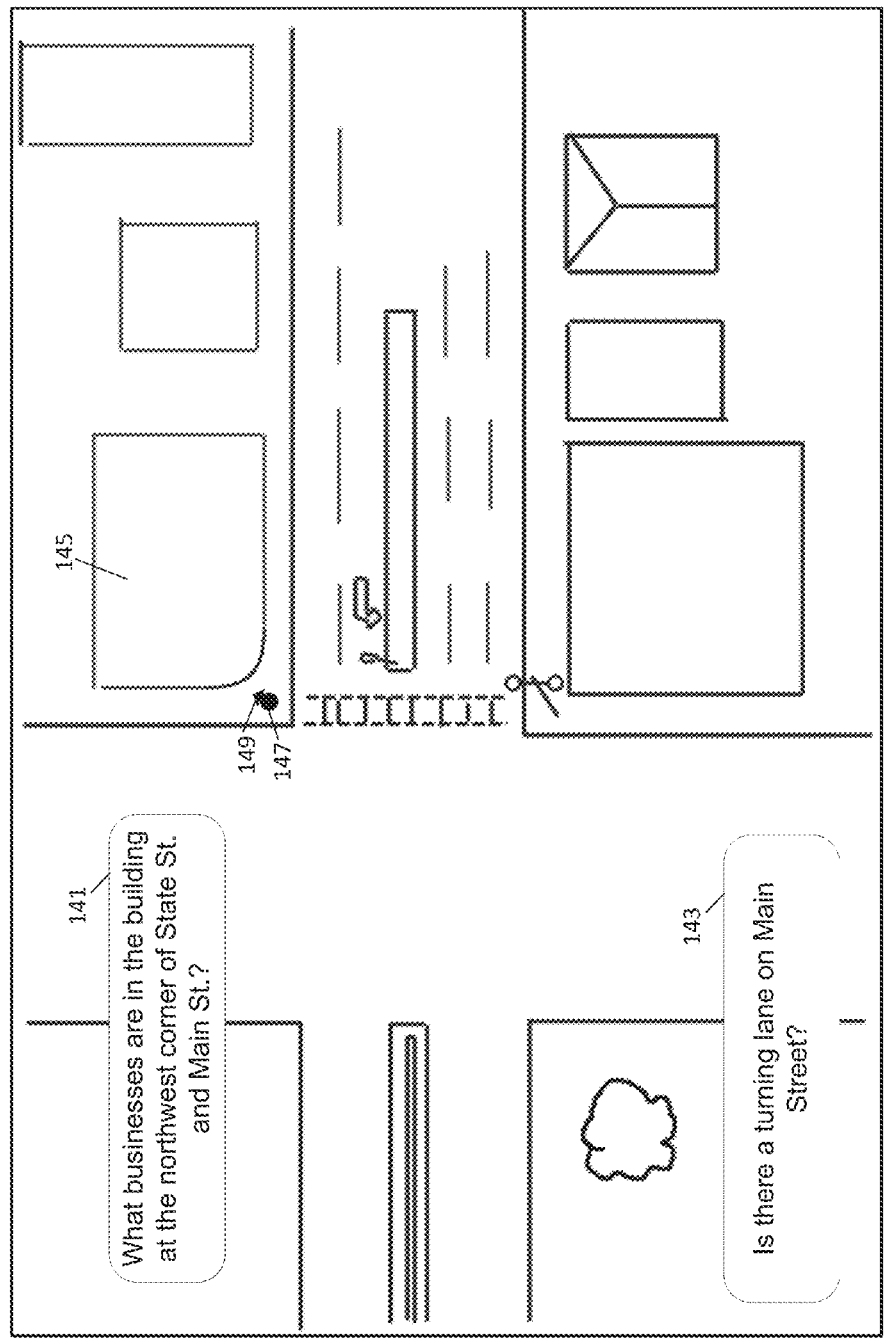
FIG. 3 illustrates an example probe question blended in an overhead view.

FIG. 3 illustrates an example blended question in an overhead view. The overhead view may be derived from a satellite image or another type of aerial image. The satellite image may be compared to the geographic database 123 to identify missing information. The server 125 may generate probe questions based on the missing information.

For example, the server 125 may identify that no points of interest or other information is included for building 145. Probe question 141 illustrates an example prompt to the user of the mobile device to provide information related to the building 145. The probe question may ask the user to list the business in the building or take a picture of signs for the building. In another example, attributes of a road may be missing from the geographic database 123 and not discernible from the satellite image. The number of lanes, speed limit, direction of traffic, parking zones, or other attributes may be the basis for a probe question. For example, probe question 143 requests that the user visual inspect the road or signage to determine if there is a turning lane.

Both probe question 141 and provide question 143 may be sent to the mobile device 122 at or near the same time. Additional probe questions may be included. The probe questions may be presented on the satellite image in proximity to the subject matter of the question. For example, probe question 141 may be shown adjacent to or overlapping building 145. The probe questions may be presented one at a time in sequence.

An icon 147 may be overlaid on the satellite image to shown the current location of the mobile device 122. A heading indicator 149 may be included to shown the direction that the user is facing. The user may compare his surroundings to the satellite image and the estimated position shown by the icon 147 to help identify the subject matter of the probe questions.

Figure 4:
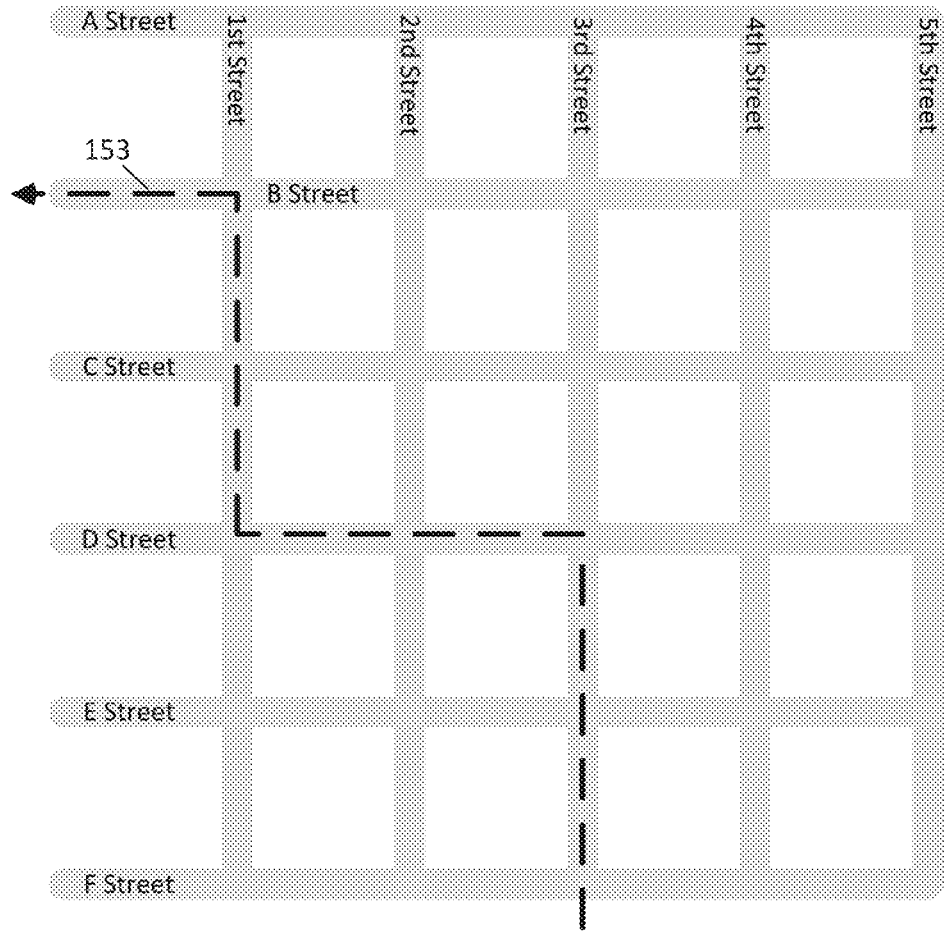
FIG. 4 illustrates an example probe question with a map view.

FIG. 4 illustrates an example blended question in a map view. The server 125 may provide a route 153 from the current position of the mobile device 122 to a destination. The probe question 151 may be selected as a function of the route 153. The probe question 151 may ask for the user to identify a geographic feature or attribute along the route 153. For example, the probe question 151 may ask whether a particular street in the route 153 has a parking zone.

Figure 5:
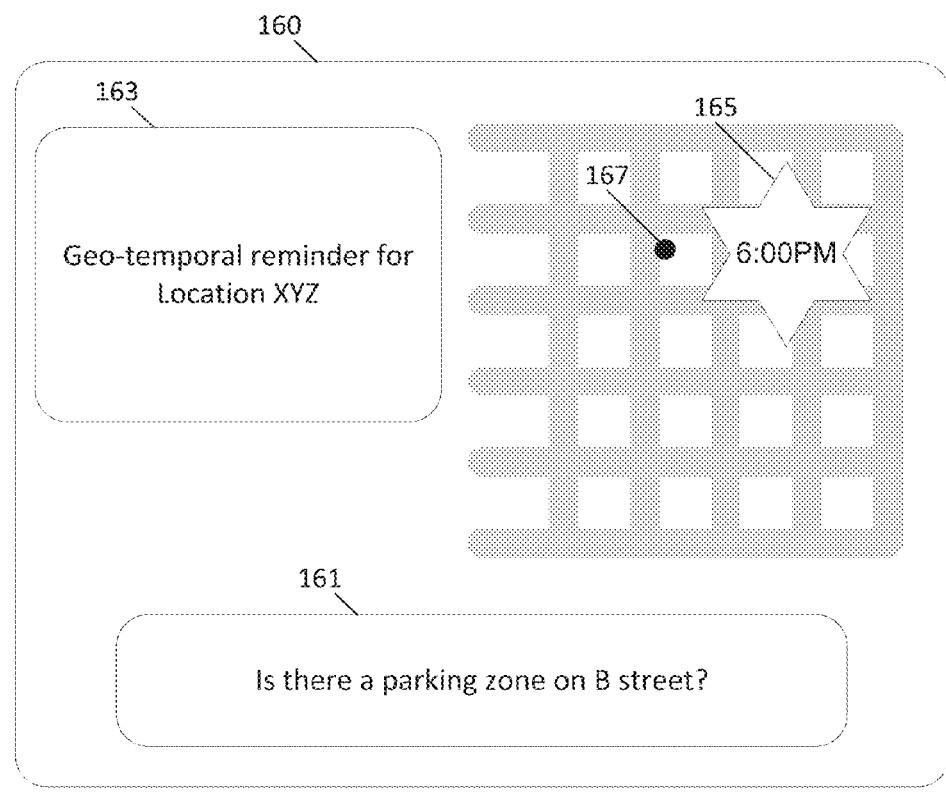
FIG. 5 illustrates an example probe question blended in a geo-temporal reminder.

FIG. 5 illustrates an example blended question in a geo-temporal reminder 160. The geo-temporal reminder may be set by the mobile device 122 at a specific location 167. The user enters a time 165 to return to the specific location 167. The mobile device 122 or the server 125 monitors the current location of the mobile device 122 and the distance to the specific location 167. If the mobile device 122 travels too far away to return by the specified time, the geo-temporal reminder 160 is displayed to the user. The geo-temporal reminder 160 may be triggered as a function of the current mode of transport for the mobile device 122. The current mode of transport may be determined based on current or recent speeds of the mobile device 122.

The geo-temporal reminder 160 may include an identification message 163 that describes why the geo-temporal reminder 160 was triggered. For example, the identification message 163 may include the distance to the specific location 167, the determined mode of transport, the time the geo-temporal reminder 160 was set, or other information. A probe question may be blended with the geo-temporal reminder 160. For example, probe question 161 requests that the user identify parking zones near or en route to the specification location 167.

Figure 6:
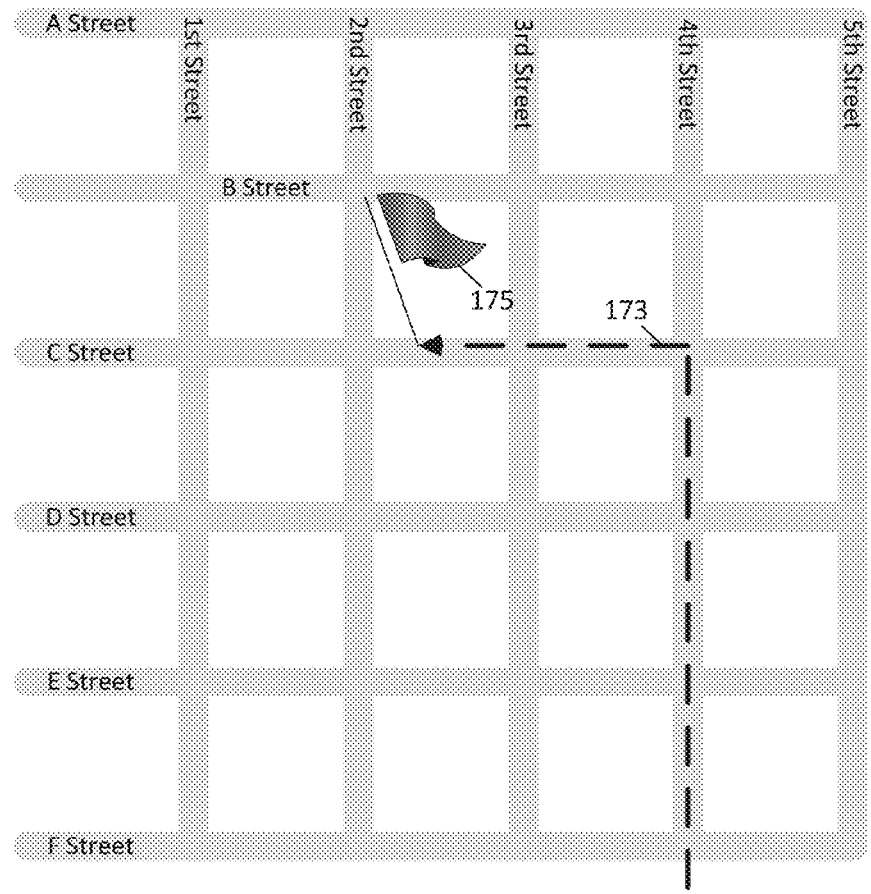
FIG. 6 illustrates another example probe question with a map view.

FIG. 6 illustrates another example blended question in a map view. The map view includes a route 173 to a beacon 175. The beacon 175 may be set by the user generated submission. The beacon 175 is set according to the current location of the mobile device 122 to mark a location that the user would like to return to. In one example, the beacon 175 may be set at a location that cannot otherwise be searched in the geographic database 123. The beacon 175 may be used to return to a parking spot, a residence, an outdoor location, or any past location of the mobile device 122. When the user requests to return to the location of the beacon 175, the mobile device 122 provides routing directions to the location. The mobile device 122 may display one or more blended questions with the routing directions.

The mobile device 122 may distribute the probe questions according to a crowdsourcing technique. Multiple mobile devices 122 may be sent the same probe question by the server 125. The answers may be compared to each other in order to corroborate the answers. In one example, when an answer message corroborates one or more previously received answers, the server 125 updates the geographic database 123 according to information in the answer message.

Figure 7:
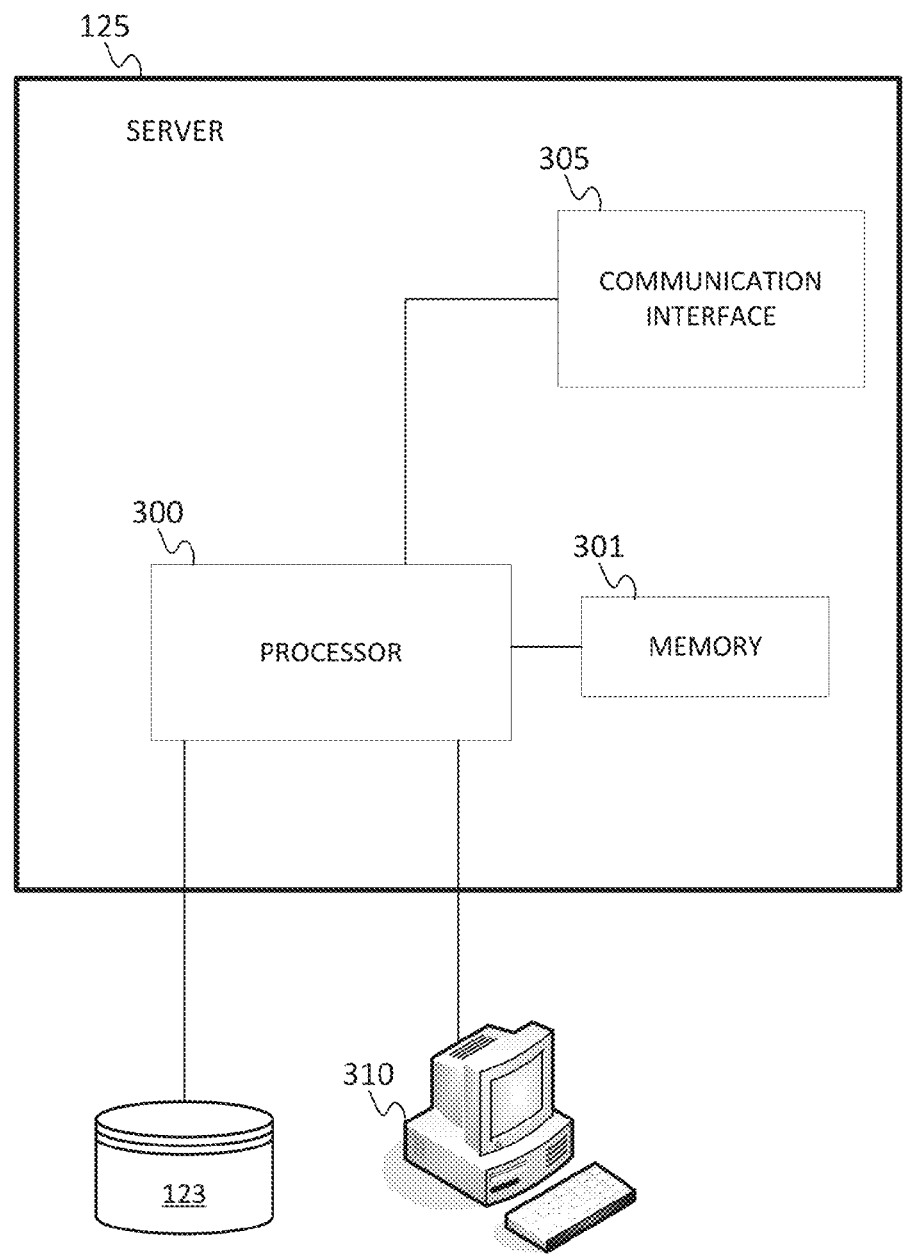
FIG. 7 illustrates an exemplary server of the system of FIG. 1.

FIG. 7 illustrates an exemplary server of the system of FIG. 1. The server 125 includes a processor 300, a communication interface 305, and a memory 301. Additional, different, or fewer components may be included. The server 125 may be coupled to a geographic database 123 and a workstation 310. The workstation 310 may be used as an input device for the server 125. In addition, the communication interface 305 is an input device for the server 125.

The communication interface 305 receives data indicative of use inputs made via the workstation 128 or the mobile device 122.

The memory 301 stores instructions for updating the geographic database. The processor 300, which may be any type of controller, executes the instructions. The communication interface 305 communicates with one or more mobile device 122. The communication interface 305 receives a user generated submission and location data from the mobile device 122. The user generated submission may be a request for a location based service, such as navigation or a geotagged post. The processor 300 may execute a submission service that tracks submissions in the location based service and the locations of the mobile device 122 when the submissions were made.

The processor 300 may be configured to identify an incomplete entry in the geographic database 123 based on the location data. The geographic database 123 may include a list of geographic objects or attributes. The geographic objects may include points of interests, road segments, or other objects. The geographic attributes, which describe the objects, include lane identification, speed limits, parking zones, business names, hours of operation or other characteristics. Each of the graphical objects and/or graphical attributes may be listed in the geographic database 123 with a status. The status may be confirmed, unconfirmed, or omitted. A confirmed status indicates that no more information for the attribute is needed. The unconfirmed status indicates that some information has been submitted but additional submissions are needed before the information is confirmed. The omitted status indicates that the particular attribute has not been added to the geographic database 123.

The processor 300 may be configured to identify geographic objects with unconfirmed or omitted statuses with a predetermined distance range. The processor 300 may execute a map matching service that matches the unconfirmed or omitted status of graphical objects with the predetermined distance range to the mobile device 122. The predetermined distance range may be a constant distance or a variable distance. The variable distance may be a function of the mode of travel of the mobile device 122. The variable distance may be a function of the type of location based service that included the submission. The variable distance may be user configurable (e.g., entered by workstation 310).

The processor 300 may be configured to select a probe question to acquire additional information on the graphical objects with unconfirmed or omitted attributes. The processor 300 may execute a map attribute query service that identifies the unconfirmed or omitted attributes. The probe question may be selected from a list of questions. Each possible attribute may be associated with a probe question template. The location of the graphical object may be inserted into the probe question template. The communication interface 305 sends the probe question to the mobile device 122. The processor 300 may execute a notification server that blends the questions into the location based service.

Figure 8:
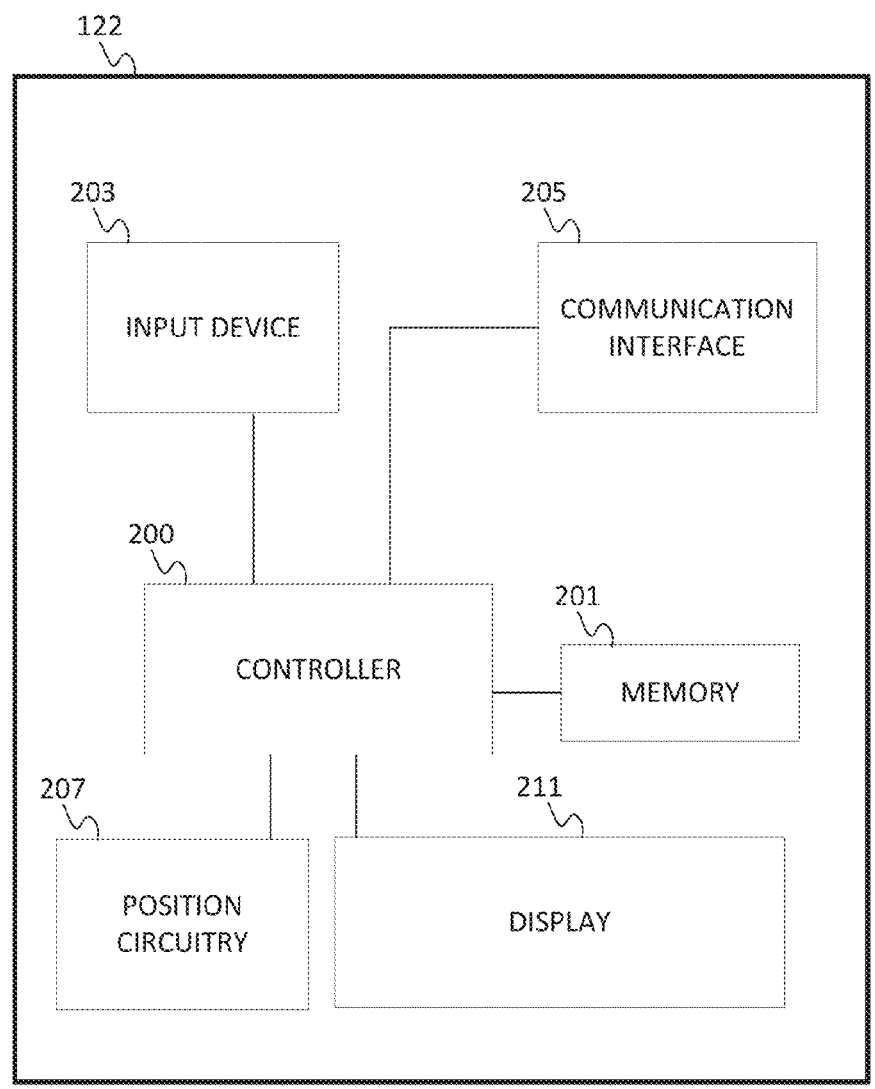
FIG. 8 illustrates an exemplary mobile device of the system of FIG. 1.
Figure 9:
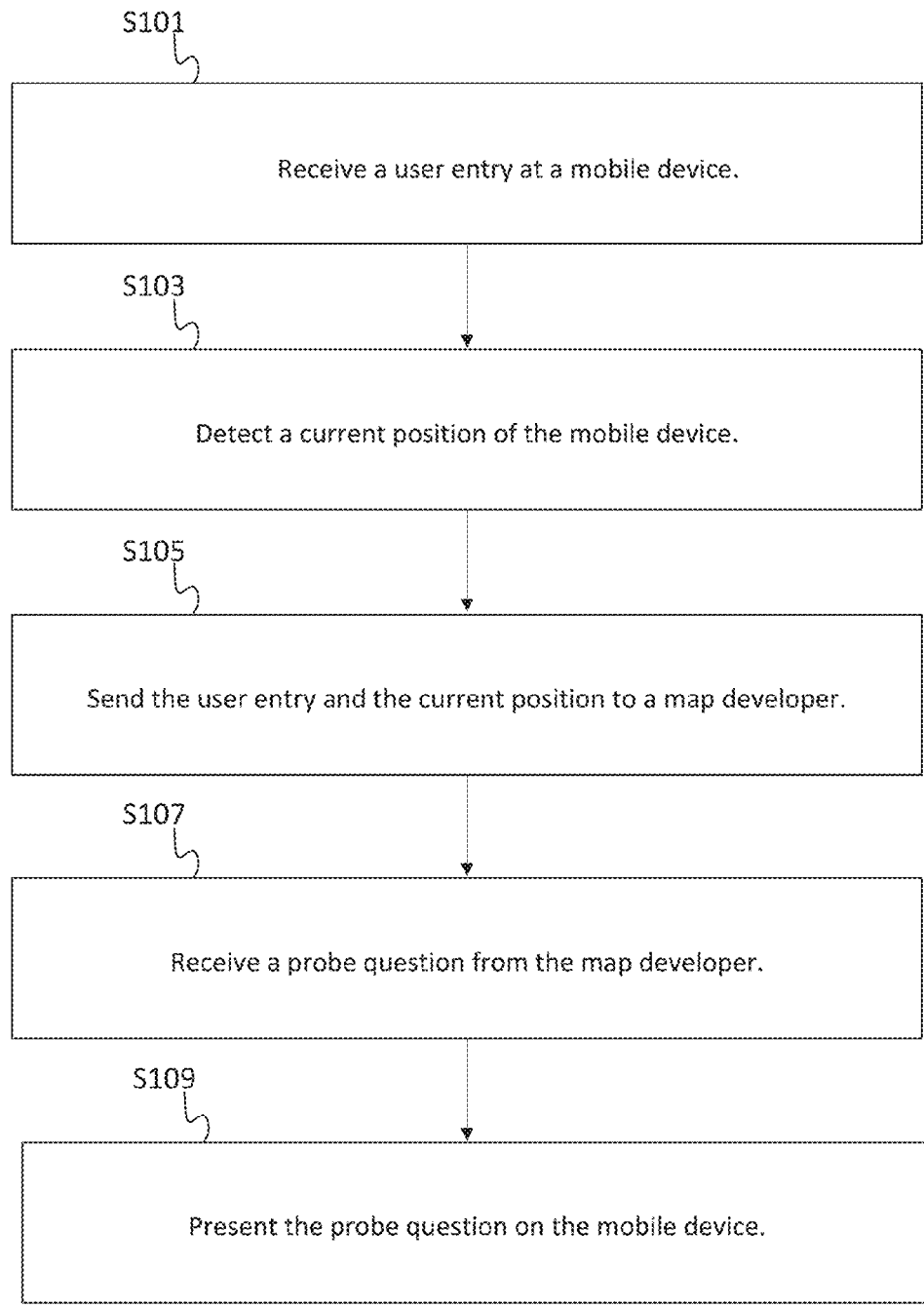
FIG. 9 illustrates an example flowchart for updating a geographic database.

FIG. 8 illustrates an exemplary mobile device of the system of FIG. 1. The mobile device 122 may be referred to as a navigation device. The mobile device 122 includes a controller 200, a memory 201, an input device 203, a communication interface 205, position circuitry 207, a camera 209, and a display 211. FIG. 9 illustrates an example flowchart for updating the geographic database, which is described in relation to the mobile device 122 but may be performed by another device. Additional, different, or fewer acts may be provided.

At act S101, the communication interface 205 receives a user entry at the input device 203. The user entry may be a search query such as a destination or business. The user entry may be a photo that is uploaded for a location based service. The photo may include one or more objects that the user would like to share with other users. For example, the photo may include a point of interest or another graphical feature to be added to a graphical database. The photo may include a location that the user would like to return to.

At act S103, the position circuitry 207 detects a current position of the mobile device 122. Act S103 may occur before, during, or after act S101. At act S105, the communication interface 205 sends the user entry and the current position to a map developer such as server 125. The server 125 processes the search query or photo of the user entry to provide both the information requested by the user entry and a probe question.

At act S107, the communication interface 205 receives a probe question from the map developer. The probe question relates to an incomplete entry in the geographic database within a predetermined range from the current position of the mobile device 122. In one example, the probe question is received before the information requested by the user. Thus, the user must answer the probe question before receiving the information. In another example, the requested information and the probe question are received at the same time (e.g., after uploading a photo of a doctor's office that does not appear on the map, the user receives the message: Thank you for submitted Dr. Zeller's office to be added to the map. In order to maintain accuracy, please confirm that the office is immediately adjacent to the coffee shop on Main St.).

At act S109, the probe question is displayed on the display 211 of the mobile device 122. The probe question may be integrated with a map or another feature of a location based service. The probe question may block the view of part of the location based service until the probe question is answered via textual or other input at the input device 203.

The input device 203 may be one or more buttons, keypad, keyboard, mouse, stylist pen, trackball, rocker switch, touch pad, voice recognition circuit, or other device or component for inputting data to the mobile device 122. The input device 203 and the display 211 may be combined as a touch screen, which may be capacitive or resistive. The display 211 may be a liquid crystal display (LCD) panel, light emitting diode (LED) screen, thin film transistor screen, or another type of display.

The positioning circuitry 207 is optional and may be excluded for the map-related functions. The positioning circuitry 207 may include a Global Positioning System (GPS), Global Navigation System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 201 and/or memory 301 may be a volatile memory or a non-volatile memory. The memory 201 and/or memory 301 may include one or more of a read only memory (ROM), random access memory (RAM), a flash memory, an electronic erasable program read only memory (EEPROM), or other type of memory. The memory 201 and/or memory 301 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides wireless and/or wired communications in any now known or later developed format.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is shown to be a single medium (e.g., memory 201 and/or memory 301), the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
   receiving a user generated submission from a mobile device, wherein the user generated submission is associated with a geolocation;
   identifying an incomplete entry in a geographic database based on the geolocation;
   generating a probe question for the incomplete entry;
   sending the probe question to the mobile device;
   receiving an answer message for the probe question from the mobile device;
   comparing the answer message to one or more previously received answers; and
   if the answer message corroborates the one or more previously received answers, updating the geographic database according to information in the answer message.

2. The method of claim 1, wherein the probe question requests an image capture.

3. A method comprising:
   receiving a user generated submission from a mobile device, wherein the user generated submission is associated with a geolocation;
   identifying an incomplete entry in a geographic database based on the geolocation,
   wherein the incomplete entry in the geographic database is an unconfirmed geographic entry or an omitted geographic entry;
   generating a probe question for the incomplete entry; and
   sending the probe question to the mobile device.

4. The method of claim 3, further comprising:
   receiving an answer message for the probe question from the mobile device; and
   modifying the incomplete entry in the geographic database based on the answer message.

5. The method of claim 4, wherein the probe question requests a visual inspection of a road, a point of interest, a building, or an address.

6. The method of claim 3, further comprising:
   receiving an answer message for the probe question from the mobile device;
   comparing the answer message to one or more previously received answers; and
   if the answer message corroborates the one or more previously received answers, updating the geographic database according to information in the answer message.

7. The method of claim 3, wherein the probe question is overlaid on a satellite image or map.

8. The method of claim 3, wherein the user generated submission sets a geo-temporal reminder.

9. A method comprising:
   receiving a user entry at a mobile device, wherein the user entry includes location based content;
   detecting a current position of the mobile device;
   sending the user entry and the current position to a map developer;
   receiving a probe question from the map developer; and
   presenting the probe question on the mobile device,
   wherein the probe question relates to an incomplete entry in a geographic database within a predetermined range from the current position of the mobile device.

10. The method of claim 9, further comprising:
    receiving an answer to the probe question on the mobile device.

11. The method of claim 9, further comprising:
    receiving a location based service based on the user entry.

12. The method of claim 9, further comprising:
    receiving a location based service based on the mobile device;
    receiving an answer to the probe question on the mobile device; and
    providing the location based service in response to receiving the answer to the probe question.

13. The method of claim 9, where the user entry defines a beacon.

14. An apparatus comprising:
    a user interface configured to receive a user entry for a location based service;
    position circuitry configured to detect a current position of the apparatus; and
    a communication interface configured to send the user entry and the current position to a server and receive a probe question from the server,
    wherein the probe question is a function of the current position,
    wherein the location based service is provided in response to transmission of a plurality of answers.

15. The apparatus of claim 14, wherein the user interface is configured to display the probe question overlaid on a map image.

16. The apparatus of claim 14, wherein the probe question relates to an incomplete entry in a geographic database within a predetermined distance range of the current position of the apparatus.

17. An apparatus comprising:
    at least one processor; and
    at least one memory including computer program code for one or more programs, the at least one memory and the computer program code configured to, with the at least one processor, cause the apparatus to perform at least the following,
    receive a user generated submission and location data from a mobile device, wherein the user generated submission is associated with a location based service;
    identify an incomplete entry in a geographic database based on the location data;
    generate a probe question for the incomplete entry;
    send the probe question to the mobile device;

receive an answer message for the probe question from the mobile device;

perform a comparison between the answer message and one or more previously received answers; and update the geographic database according to the comparison.

18. The apparatus of claim 17, wherein the location based service is provided in response to an answer to the probe question.

19. The apparatus of claim 17, wherein the probe question requests a visual inspection of a road, a point of interest, a building, or an address.

* * * * *